(12) United States Patent
Ohno et al.

(10) Patent No.: US 7,947,231 B2
(45) Date of Patent: May 24, 2011

(54) HONEYCOMB STRUCTURE, METHOD FOR MANUFACTURING HONEYCOMB STRUCTURE, AND EXHAUST GAS PURIFYING APPARATUS

(75) Inventors: Kazushige Ohno, Ibi-gun (JP); Akihiro Ohira, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 672 days.

(21) Appl. No.: 12/053,885

(22) Filed: Mar. 24, 2008

(65) Prior Publication Data

US 2008/0241012 A1 Oct. 2, 2008

(30) Foreign Application Priority Data

Mar. 30, 2007 (WO) ............... PCT/JP2007/057296

(51) Int. Cl.
*B01D 50/00* (2006.01)
(52) U.S. Cl. ........................................... 422/180
(58) Field of Classification Search .......... 422/177, 422/180; 428/116; 55/524, 523
See application file for complete search history.

(56) References Cited

U.S. PATENT DOCUMENTS

| | | | |
|---|---|---|---|
| 5,914,187 A | 6/1999 | Naruse et al. |
| 6,669,751 B1 | 12/2003 | Ohno et al. |
| 6,939,825 B1 | 9/2005 | Ohno et al. |
| 7,112,233 B2 | 9/2006 | Ohno et al. |
| 7,119,046 B2 | 10/2006 | Ohno et al. |
| 7,196,037 B2 | 3/2007 | Ohno et al. |
| 7,250,385 B1 | 7/2007 | Ohno et al. |
| 7,309,370 B2 | 12/2007 | Kudo et al. |
| 2001/0024686 A1 | 9/2001 | Kiessling et al. |
| 2004/0033175 A1 | 2/2004 | Ohno et al. |
| 2004/0161596 A1 | 8/2004 | Taoka et al. |
| 2005/0102987 A1 | 5/2005 | Kudo |
| 2005/0109023 A1 | 5/2005 | Kudo et al. |
| 2005/0153099 A1 | 7/2005 | Yamada |
| 2005/0160710 A1 | 7/2005 | Taoka et al. |
| 2005/0161849 A1 | 7/2005 | Ohno et al. |
| 2005/0169818 A1 | 8/2005 | Ohno et al. |
| 2005/0169819 A1 | 8/2005 | Shibata |
| 2005/0175514 A1 | 8/2005 | Ohno |
| 2005/0178098 A1 | 8/2005 | Ono et al. |
| 2005/0180898 A1 | 8/2005 | Yamada |
| 2005/0229565 A1 | 10/2005 | Yoshida |
| 2005/0247038 A1 | 11/2005 | Takahashi |
| 2005/0272602 A1 | 12/2005 | Ninomiya |
| 2006/0021310 A1 | 2/2006 | Ohno et al. |
| 2006/0051556 A1 | 3/2006 | Ohno et al. |
| 2006/0166820 A1 | 7/2006 | Ogyu et al. |

(Continued)

FOREIGN PATENT DOCUMENTS

CA 2485893 4/2005

(Continued)

*Primary Examiner* — Tom Duong
(74) *Attorney, Agent, or Firm* — Ditthavong Mori & Steiner, P.C.

(57) ABSTRACT

A honeycomb structure includes a plurality of pillar-shaped honeycomb fired bodies each having a large number of cells longitudinally disposed in parallel with one another with a cell wall therebetween. The plurality of pillar-shaped honeycomb fired bodies are combined with one another by interposing an adhesive layer. A catalyst supporting layer is included in the adhesive layer which abuts one end face side of the honeycomb structure, while substantially no catalyst supporting layer is included in the adhesive layer which abuts another end face side of the honeycomb structure.

46 Claims, 5 Drawing Sheets

U.S. PATENT DOCUMENTS

| | | | |
|---|---|---|---|
| 2006/0188415 | A1 | 8/2006 | Ohno et al. |
| 2006/0194018 | A1 | 8/2006 | Ohno et al. |
| 2006/0210765 | A1 | 9/2006 | Ohno et al. |
| 2006/0213163 | A1 | 9/2006 | Taoka et al. |
| 2006/0216466 | A1 | 9/2006 | Yoshida |
| 2006/0216467 | A1 | 9/2006 | Yoshida |
| 2006/0222812 | A1 | 10/2006 | Koyama et al. |
| 2006/0225390 | A1 | 10/2006 | Yoshida |
| 2006/0228521 | A1 | 10/2006 | Ohno et al. |
| 2006/0230732 | A1 | 10/2006 | Kunieda |
| 2006/0254231 | A1 | 11/2006 | Hayashi et al. |
| 2007/0004593 | A1 | 1/2007 | Ohno et al. |
| 2007/0020155 | A1 | 1/2007 | Ohno et al. |
| 2007/0028575 | A1 | 2/2007 | Ohno et al. |
| 2007/0044444 | A1 | 3/2007 | Oshimi |
| 2007/0065348 | A1 | 3/2007 | Ohno et al. |
| 2007/0068128 | A1 | 3/2007 | Oshimi et al. |
| 2007/0092692 | A1* | 4/2007 | Masukawa et al. ........... 428/116 |
| 2007/0116908 | A1 | 5/2007 | Ohno et al. |
| 2007/0126160 | A1 | 6/2007 | Takahashi |
| 2007/0128405 | A1 | 6/2007 | Sakaguchi et al. |
| 2007/0130897 | A1 | 6/2007 | Sakaguchi et al. |
| 2007/0169453 | A1 | 7/2007 | Hayakawa |
| 2007/0178275 | A1 | 8/2007 | Takahashi |
| 2007/0190289 | A1 | 8/2007 | Fujita |
| 2007/0190350 | A1 | 8/2007 | Ohno et al. |
| 2007/0196620 | A1 | 8/2007 | Ohno et al. |
| 2007/0204580 | A1 | 9/2007 | Kunieda |
| 2007/0212517 | A1 | 9/2007 | Ohno et al. |
| 2007/0293392 | A1 | 12/2007 | Ohno et al. |
| 2008/0017572 | A1 | 1/2008 | Kudo |
| 2008/0083202 | A1 | 4/2008 | Kunieda et al. |
| 2008/0241009 | A1 | 10/2008 | Ohno et al. |
| 2008/0241010 | A1 | 10/2008 | Ohno et al. |
| 2008/0241011 | A1 | 10/2008 | Ohno et al. |
| 2008/0241012 | A1 | 10/2008 | Ohno et al. |
| 2008/0241013 | A1 | 10/2008 | Ohno et al. |
| 2008/0247918 | A1 | 10/2008 | Ohno et al. |
| 2008/0260599 | A1 | 10/2008 | Ohno et al. |

FOREIGN PATENT DOCUMENTS

| | | |
|---|---|---|
| DE | 19547597 | 7/1997 |
| EP | 1820946 | 8/2007 |
| JP | 8-028246 | 1/1996 |
| JP | 2003-154223 | 5/2003 |
| JP | 2005-131551 | 5/2005 |
| WO | WO 2007/000847 | 1/2007 |

* cited by examiner

B-B line cross-sectional view

HONEYCOMB STRUCTURE, METHOD FOR MANUFACTURING HONEYCOMB STRUCTURE, AND EXHAUST GAS PURIFYING APPARATUS

CROSS-REFERENCE TO RELATED APPLICATIONS

The present application claims priority under 35 U.S.C. §119 to PCT Application No. PCT/JP2007/057296, filed Mar. 30, 2007, the contents of which are incorporated herein by reference in their entirety.

BACKGROUND OF THE INVENTION

1. Field of the Invention

The present invention relates to a honeycomb structure, a method for manufacturing a honeycomb structure, and an exhaust gas purifying apparatus.

2. Discussion of the Background

In recent years, particulate matter (hereinafter, referred to simply as "particulate" or "PM") contained in exhaust gases discharged from internal combustion engines of vehicles such as buses and trucks, and construction machines have raised serious problems as contaminants harmful to the environment and the human body.

For this reason, various honeycomb structures made of porous ceramics have been proposed as filters that capture particulate matter in exhaust gases and purify the exhaust gases.

JP-A 8-28246 has disclosed a ceramic structured body in which a plurality of ceramic members, each having a structure in which a plurality of through holes are longitudinally placed in parallel with one another and each of end faces of the through holes are plugged into a checkered pattern with the opened and closed states being reversed on the gas inlet side and the gas outlet side, and with these adjacent through holes allowing gas to permeate from one to the other through a porous partition wall, are combined with one another into an aggregated body, and in this ceramic structured body, the respective ceramic members are integrally bonded to one another by interposing a sealing material of an elastic material made from at least inorganic fibers, an inorganic binder, an organic binder and inorganic particles.

JP-A 8-28246 describes that in this ceramic structured body, since the respective ceramic members are integrally bonded to one another by interposing a sealing material layer (a porous sealing material layer) made from an elastic material therebetween, it is possible to release a thermal stress by this sealing material.

The contents of JP-A 8-28246 are incorporated herein by reference in their entirety.

SUMMARY OF THE INVENTION

A honeycomb structure in accordance with a first aspect of the present invention is provided that includes a plurality of pillar-shaped honeycomb fired bodies each having a large number of cells longitudinally disposed in parallel with one another with a cell wall therebetween. The plurality of pillar-shaped honeycomb fired bodies are combined with one another by interposing an adhesive layer. A catalyst supporting layer is included in the adhesive layer which abuts one end face side of the honeycomb structure, while substantially no catalyst supporting layer is included in the adhesive layer which abuts another end face side of the honeycomb structure.

A method for manufacturing a honeycomb structure in accordance with a second aspect of the present invention includes providing a plurality of pillar-shaped honeycomb fired bodies each having a large number of cells longitudinally disposed in parallel with one another with a cell wall therebetween. The plurality of pillar-shaped honeycomb fired bodies are combined with one another by interposing an adhesive layer. The method further includes immersing the honeycomb structure in a metal-compound solution with one end face of the honeycomb structure facing down so that a predetermined area, in which the catalyst supporting layer is to be formed, is immersed in the metal-compound solution; and adhering particles for forming the catalyst supporting layer to the predetermined area of the honeycomb structure selectively to form a catalyst supporting layer. Thus, the catalyst supporting layer is formed in the adhesive layer which abuts one end face side of the honeycomb structure, while substantially no catalyst supporting layer substantially is formed in the adhesive layer which abuts another end face side of the honeycomb structure.

An exhaust gas purifying apparatus in accordance with a third aspect of the present invention includes a honeycomb structure; a casing that covers an outside of the honeycomb structure; and a holding sealing material disposed between the honeycomb structure and the casing. The honeycomb structure includes a plurality of pillar-shaped honeycomb fired bodies each having a large number of cells longitudinally disposed in parallel with one another with a cell wall therebetween. The plurality of pillar-shaped honeycomb fired bodies are combined with one another by interposing an adhesive layer. A catalyst supporting layer is included in the adhesive layer which abuts one end face side of the honeycomb structure, while substantially no catalyst supporting layer is included in the adhesive layer which abuts another end face side of the honeycomb structure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

A honeycomb structure according to an embodiment of the present invention includes a plurality of pillar-shaped honeycomb fired bodies each having a large number of cells longitudinally disposed in parallel with one another with a cell wall therebetween and being combined with one another by interposing an adhesive layer, wherein a catalyst supporting layer is included in the adhesive layer which abuts one end face side of the honeycomb structure, and wherein substantially no catalyst supporting layer is included in the adhesive layer which abuts the other end face side of the honeycomb structure.

In the honeycomb structure according to the embodiment of the present invention, since a catalyst supporting layer is included in the adhesive layer on the one end face side of the honeycomb structure, the adhesive layer including the catalyst supporting layer tends to have a higher density in comparison with the adhesive layer not including the catalyst supporting layer. Therefore, the adhesive layer including the catalyst supporting layer is less vulnerable to wind erosion even when exhaust gases collide therewith.

Moreover, in the embodiment of the honeycomb structure, substantially no catalyst supporting layer is formed in the adhesive layer which abuts the other end face side. For this reason, even in a case where, upon carrying out the regenerating process on the honeycomb structure, burning of particulate matter causes a temperature rise in the honeycomb structure and a thermal stress is generated, it becomes easy to alleviate the thermal stress by the adhesive layer not including the catalyst supporting layer. As a result, it becomes easy to prevent occurrence of a crack in the honeycomb fired body and the adhesive layer.

Therefore, in the honeycomb structure according to the embodiment of the present invention, it is possible to avoid occurrence of a crack and peeling in the honeycomb structure and the adhesive layer at the time of the regenerating process.

In the honeycomb structure according to the embodiment of the present invention, gases are allowed to flow into the one end face side with the adhesive layer including the catalyst supporting layer, and allowed to flow out from the other end face side.

In accordance with the honeycomb structure according to the embodiment of the present invention, the one end face side of the honeycomb structure, that is, the side with the adhesive layer including the catalyst supporting layer corresponds to the gas inlet side, so that it becomes easy to prevent wind erosion of the adhesive layer caused by gases that flow into the honeycomb structure, and consequently, it becomes easy to avoid an problem caused by wind erosion in the adhesive layer.

In the honeycomb structure according to the embodiment of the present invention, either one end of each of the cells is sealed.

The honeycomb structure according to the embodiment of the present invention is desirably used as a DPF (Diesel Particulate Filter) for capturing particulate matter in exhaust gases.

In the honeycomb structure according to the embodiment of the present invention, an area not including the catalyst supporting layer in the adhesive layer corresponds to an area covering at least about 10% of the overall length in the longitudinal direction of the honeycomb structure.

In accordance with the honeycomb structure according to the embodiment of the present invention, since substantially no catalyst supporting layer is included in the area in the adhesive layer covering at least about 10% of the overall length in the longitudinal direction of the honeycomb structure, it becomes easy to alleviate a stress generated in the honeycomb structure at the time of the regenerating process and the like in the area with the adhesive layer not including the catalyst supporting layer. Consequently occurrence of a crack and peeling in the honeycomb structure and the adhesive layer is more easily avoided.

In the honeycomb structure according to the embodiment of the present invention, the adhesive layer is formed by using a composition including as a main component: inorganic fibers and an inorganic binder; inorganic particles and an inorganic binder; or inorganic fibers, inorganic particles and an inorganic binder.

In accordance with the honeycomb structure according to the embodiment of the present invention, the adhesive layer is formed by using a composition including as a main component: inorganic fibers and an inorganic binder; inorganic particles and an inorganic binder; or inorganic fibers, inorganic particles and an inorganic binder. Since the adhesive layer formed by fixing such inorganic fibers and inorganic particles by using the inorganic binder has a higher elasticity in comparison with the honeycomb fired body, it is suitably used for alleviating the stress generated in the honeycomb structure, so that it becomes easy to more positively avoid occurrence of a crack and peeling in the honeycomb fired body and the adhesive layer at the time of the regenerating process and the like.

In the honeycomb structure according to the embodiment of the present invention, the inorganic particles are particles including a carbide ceramic or a nitride ceramic.

Moreover, in the honeycomb structure according to the embodiment of the present invention, the catalyst supporting layer included in the adhesive layer contains an oxide ceramic.

In a case where, as disclosed in JP-A 8-28246, a honeycomb structure in which a plurality of honeycomb fired bodies (porous ceramic members) are combined with one another by interposing an adhesive layer is used as a filter (exhaust gas purifying filter) for capturing particulate matter in exhaust gases so as to purify the exhaust gases, the following problems are raised.

That is, since exhaust gases come to collide with the adhesive layer on an end face of the honeycomb structure on an exhaust gas inlet side, the adhesive layer is subjected to wind erosion. Therefore, when the honeycomb structure is used for a long period of time, a recess tends to be formed in the adhesive layer on the exhaust gas inlet side. When such a recess is formed, particulate matter accumulates in this recess portion, and upon carrying out a regenerating process (process for burning and removing the accumulated particulate matter), burning of the particulate matter tends to cause occurrence of a crack and peeling in the adhesive layer, and subsequently damage in the honeycomb structure tends to be caused.

It was found that it is possible to avoid wind erosion by providing the adhesive layer including the catalyst supporting layer.

However, when a catalyst supporting layer is included in the entire adhesive layer of a honeycomb structure, upon carrying out a regenerating process thereon, a crack and peeling tend to be caused in the honeycomb fired body and the adhesive layer, subsequently resulting in damage in the honeycomb structure.

The reason for this is presumably because, in a case where the catalyst supporting layer is included in the entire adhesive layer, upon carrying out the regenerating process, the adhesive layer fails to alleviate a stress generated in the honeycomb structure, so that a crack and peeling are caused.

Based upon the above mentioned facts, it was subsequently found that by forming a catalyst supporting layer only on one of end sides of the honeycomb structure, it becomes easy to prevent wind erosion of the adhesive layer and consequently, it becomes easy to prevent occurrence of a crack, peeling, and the like in the honeycomb fired body and the adhesive layer.

First Embodiment

The following description will discuss a first embodiment which is one of the embodiments of the present invention.

Figure 1A:
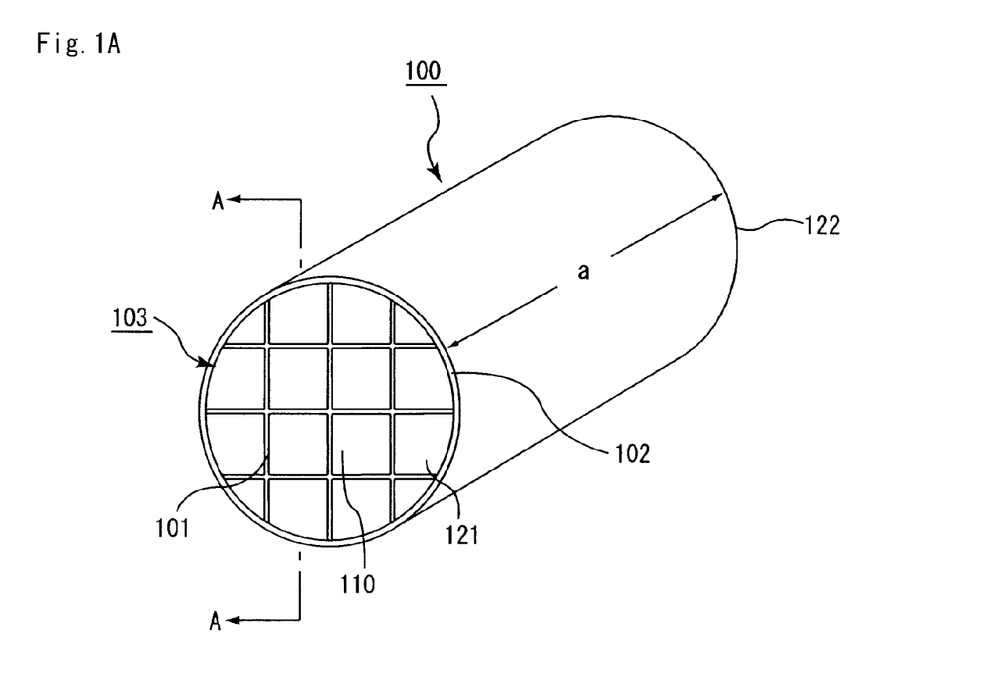
FIG. 1A is a perspective view schematically showing one example of a honeycomb structure according to an embodiment of the present invention.
Figure 1B:
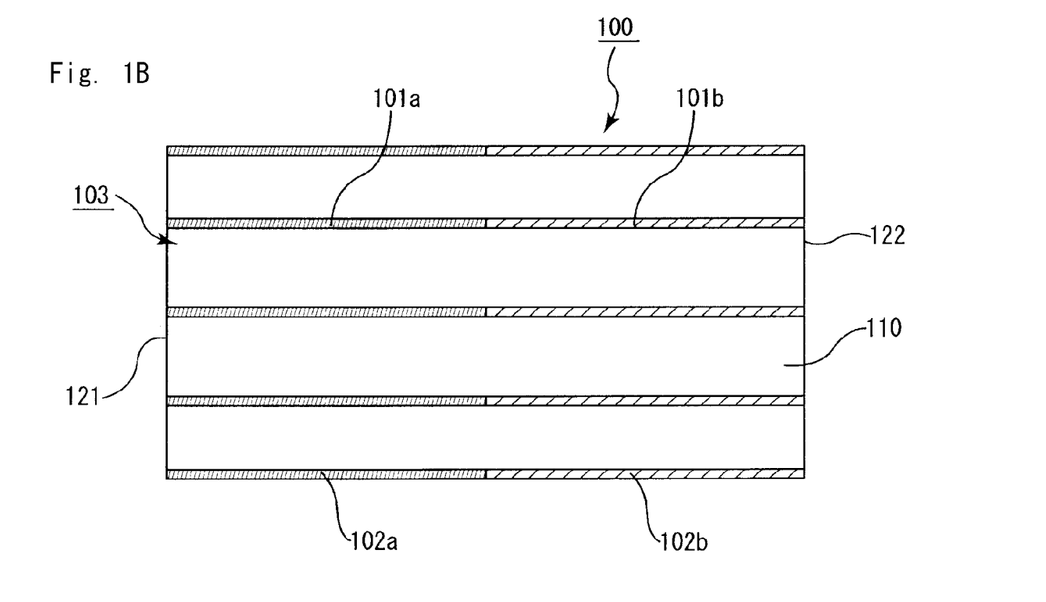
FIG. 1B is a cross-sectional view taken along line A-A of FIG. 1A.
Figure 2A:
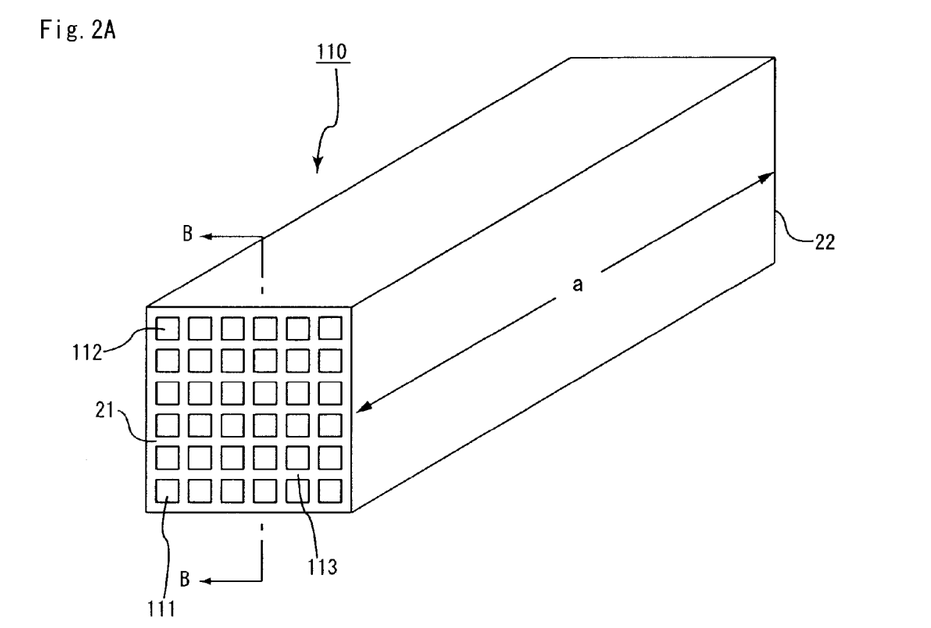
FIG. 2A is a perspective view schematically showing one example of a honeycomb fired body forming the honeycomb structure according to the embodiment of the present invention.

FIG. 1A is a perspective view schematically showing one example of the honeycomb structure according to the embodiment of the present invention, and FIG. 1B is a cross-sectional view taken along the line A-A of FIG. 1A. FIG. 2A is a perspective view schematically showing one example of the honeycomb fired body forming the honeycomb structure according to the embodiment of the present invention, and FIG. 2B is a cross-sectional view taken along the line B-B of FIG. 2A.

Here, in FIGS. 1A and 2A, the front side of each of the perspective views corresponds to the end face on the side through which exhaust gases flow in, and the rear side thereof corresponds to the end face on the side from which exhaust gases flow out.

Figure 2B:
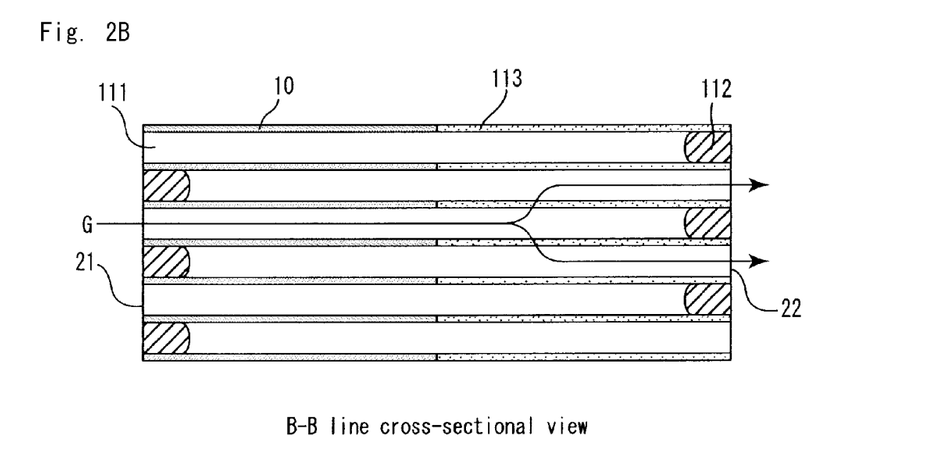
FIG. 2B is a cross-sectional view taken along line B-B of FIG. 2A.

In a honeycomb structure 100, a plurality of honeycomb fired bodies 110 as shown in FIGS. 2A and 2B are combined with one another by interposing an adhesive layer 101 in between to configure a ceramic block 103, and a coat layer 102 is further formed on the outer periphery of the ceramic block 103.

Here, out of the adhesive layers 101 used for combining the honeycomb fired bodies 110, an adhesive layer on a gas inlet side 121 is an adhesive layer 101a including a catalyst supporting layer made of alumina, and an adhesive layer on a gas outlet side 122 is an adhesive layer 101b not including a catalyst supporting layer.

More specifically, the area covering virtually half (about 50%) of the overall length (length in the longitudinal direction [direction of an arrow a in FIG. 1A]) from the gas inlet side 121 of the adhesive layer 101 corresponds to the adhesive layer 101a including the catalyst supporting layer, and the area covering virtually half of the overall length from the gas outlet side 122 of the adhesive layer 101 corresponds to the adhesive layer 101b not including the catalyst supporting layer.

The honeycomb fired body 110 includes porous silicon carbide as a main component, and is formed by a large number of cells 111 placed in parallel with one another in a longitudinal direction (the direction shown by an arrow a in FIG. 2A) with a cell wall 113 therebetween, and either one end of each of the cells 111 is sealed with a plug 112.

Therefore, in the honeycomb fired body 110, exhaust gases G which have flowed into cells 111 having an opening at an end face 21 on the gas inlet side are allowed to flow out from other cells 111 having an opening at an end face 22 on the gas outlet side, after passing through cell walls 113 separating the cells.

As a result, in the honeycomb fired body 110 (honeycomb structure 100), the cell wall 113 functions as a filter for capturing PM and the like.

Moreover, a catalyst supporting layer 10 made of alumina having a platinum (Pt) catalyst supported thereon, is formed in an area covering virtually half (about 50%) of the overall length in the longitudinal direction of the cell wall 113 of the honeycomb fired body 110.

The following description will discuss the method for manufacturing a honeycomb structure according to the present embodiment.

(1) Mixed powder is prepared as a ceramic material by mixing a silicon carbide powder having a different average diameter and an organic binder, and concurrently a mixed liquid is prepared by mixing a liquid plasticizer, a lubricant, and water. Then, the mixed powder and the mixed liquid are mixed by using a wet mixing apparatus so that a wet mixture for manufacturing a molded body is prepared.

(2) The wet mixture is charged into the extrusion-molding machine, and the wet mixture is extrusion-molded so that a honeycomb molded body having a predetermined shape is manufactured.

Further, after the honeycomb molded body has been cut into a predetermined length, the resulting honeycomb molded body is dried by using a drying apparatus thereby the honeycomb molded body having virtually the same shape as the honeycomb fired bodies shown in FIGS. 2A and 2B, is formed.

(3) Furthermore, a predetermined amount of a plug material paste to be formed into a plug is filled into a predetermined end of each of the cells, so that each of the cells is sealed. Upon sealing the cells, a mask for sealing the cells is placed on the end face of the honeycomb molded body, so that the plug material paste is filled into only cells that need to be sealed.

(4) The honeycomb molded body with either one end of each of the cells being sealed is heated in a degreasing furnace so as to carry out a degreasing process for decomposing and removing organic substances in the honeycomb molded body, thereby a honeycomb degreased body is manufactured.

Next, the honeycomb degreased body is placed into a firing furnace to carry out a firing process at a predetermined temperature (for example, at least about 2200° C. and at most about 2300° C.) so that a honeycomb fired body is manufactured.

(5) An adhesive paste is applied to a side face of the honeycomb fired body to form an adhesive paste layer thereon, and another honeycomb fired body is successively laminated with this adhesive paste layer interposed therebetween. By repeating these processes, an aggregated body of a predetermined number of honeycomb fired bodies combined with one another is manufactured. Here, with respect to the adhesive paste, an adhesive paste including inorganic fibers, inorganic particles, an inorganic binder, and an organic binder may be used.

(6) The aggregated body of honeycomb fired bodies is heated, so that the adhesive paste layers are dried and solidified to form adhesive layers including inorganic particles and an inorganic binder as main components. Thereafter, a cutting process is carried out on the aggregated body of honeycomb fired bodies by using a diamond cutter to form a ceramic block, and a coat layer paste is applied to a peripheral face of the ceramic block, then dried and solidified to form a coat layer, thereby a honeycomb structure is manufactured.

Here, as the coat layer paste, the same material as the adhesive paste can be used.

(7) Next, a catalyst supporting layer made of alumina is formed in a predetermined area (an area covering about 50% of the overall length in the longitudinal direction from the gas inlet side) of the adhesive layer, and a platinum catalyst is supported on the catalyst supporting layer. More specifically, the following processes of (a) and (b) are carried out.

(a) The honeycomb structure is immersed in an alumina solution with one end face (an face to be the end face on a gas inlet side) facing down, so that the predetermined area, in which the catalyst supporting layer is to be formed, is immersed in the alumina solution; thus, the alumina particles are selectively adhered to the predetermined area of the honeycomb structure.

Then, the honeycomb structure is dried at a temperature of at least about 110° C. and at most about 200° C. for about two hours, and the dried honeycomb structure is heated and fired at a temperature of at least about 500° C. and at most about 1000° C. so that the catalyst supporting layer is formed in the predetermined area of the honeycomb structure.

Here, this process of (a) may be carried out repeatedly. The formation amount of the catalyst supporting layer can be controlled by adjusting the number of times to repeat the process.

(b) Next, the honeycomb structure is immersed into a solution of a metal compound containing platinum, with the one end face facing down, so that the predetermined area with the catalyst supporting layer being formed therein is immersed in the alumina solution, and the immersed honeycomb structure is dried. Then, the dried honeycomb structure is heated and fired at a temperature of at least about 500° C. and at most about 800° C. under an inert atmosphere, so that a catalyst is supported on the catalyst supporting layer.

Here, by undergoing the processes (a) and (b), a catalyst supporting layer supporting a catalyst is included in a predetermined area of the adhesive layer, and a catalyst supporting layer supporting a catalyst is also included in a predetermined area (area covering about 50% of the overall length in the longitudinal direction) of each of cell walls.

The following description will discuss effects of the honeycomb structure of the present embodiment.

(1) In the adhesive layers used for combining the honeycomb fired bodies with one another, the adhesive layer on an exhaust gas inlet side is allowed to include a catalyst supporting layer supporting a catalyst, and since the adhesive layer including the catalyst supporting layer tends to have a higher density in comparison with an adhesive layer not including the catalyst supporting layer, it is possible to make the adhesive layer less vulnerable to wind erosion even when exhaust gases collide with the adhesive layer when exhaust gases are allowed to flow into the honeycomb structure.

Consequently, a recess caused by wind erosion becomes hard to be formed in the adhesive layer, and of course, no particulate matter is accumulated in the recess. Consequently, it becomes difficult to cause occurrence of a problem in that upon carrying out the regenerating process on the honeycomb structure, particulate matter accumulated in the recess of the adhesive layer burns to cause damage, such as a crack and peeling, in the adhesive layer.

Therefore, it becomes possible to ensure superior reliability of the honeycomb structure of the present embodiment.

(2) The adhesive layer includes as a main component, inorganic particles, inorganic fibers, and an inorganic binder. The catalyst supporting layer supporting a catalyst is not included in the adhesive layer on the exhaust gas outlet side and this adhesive layer not including the catalyst supporting layer is superior in elasticity to the adhesive layer including the catalyst supporting layer.

For this reason, even in a case where, upon carrying out the regenerating process on the honeycomb structure, burning of the particulate matter causes a thermal stress in the honeycomb structure, it becomes easy to alleviate the thermal stress by the elasticity possessed by the adhesive layer not including the catalyst supporting layer; thus, it becomes easy to avoid occurrence of a crack and damage in the honeycomb fired body and the adhesive layer caused by the thermal stress.

It was found that in the honeycomb structure with a catalyst supporting layer supporting a catalyst being formed in the cell walls on the exhaust gas inlet side, like the honeycomb structure of the present embodiment, more particulate matter tends to be captured on the exhaust gas outlet side. Therefore, upon carrying out the regenerating process, a temperature tends to rise on the exhaust gas outlet side.

Moreover, during the regenerating process, since heat is transferred along the flow of exhaust gases, the temperature tends to rise on the exhaust gas outlet side because of this phenomenon too.

Therefore, the configuration like the present embodiment, which is provided with an adhesive layer not including the catalyst supporting layer on the exhaust gas outlet side so that it becomes easy to alleviate the thermal stress, may also be applied effectively to the above-mentioned temperature distribution.

EXAMPLES

The following description will discuss examples which more specifically disclose the first embodiment of the present invention; however, the present invention is not limited to those examples.

Example 1

Manufacturing of Honeycomb Fired Body 52.8% by weight of coarse powder of silicon carbide having an average particle diameter of 22 μm and 22.6% by weight of fine powder of silicon carbide having an average particle diameter of 0.5 μm were mixed. To the resulting mixture, 2.1% by weight of acrylic resin, 4.6% by weight of an organic binder (methyl cellulose), 2.8% by weight of a lubricant (UNILUB, made by NOF Corporation), 1.3% by weight of glycerin, and 13.8% by weight of water were added, and then kneaded to prepare a raw material composition.

Then, the raw material composition is extrusion molded so that a raw honeycomb molded body having virtually the same shape as the shape shown in FIG. 2A was manufactured.

Next, the raw honeycomb molded body was dried by using a microwave drying apparatus to obtain a dried body of the honeycomb molded body. Thereafter, a plug material paste having the same composition as the raw material composition was filled into predetermined cells, and then again dried by a drying apparatus.

The dried honeycomb molded body was degreased at 400° C., and then fired at 2200° C. under normal pressure argon atmosphere for three hours so as to manufacture a honeycomb fired body formed by a silicon carbide sintered body with a porosity of 45%, an average pore diameter of 15 μm, a size of 34.3 mm×34.3 mm×150 mm, the number of cells (cell density) of 46.5 pcs/cm2 (300/inch2) and a thickness of the cell wall of 0.25 mm.

(Manufacturing of Honeycomb Structure)

A large number of honeycomb fired bodies were bonded to one another by using a heat resistant adhesive paste containing 30% by weight of alumina fibers having an average fiber length of 20 μm, 21% by weight of silicon carbide particles having an average particle diameter of 0.6 μm, 15% by weight of silica sol, 5.6% by weight of carboxymethyl cellulose, and 28.4% by weight of water. The bonded honeycomb fired bodies were dried at 120° C., and then cut by using a diamond cutter so that a round pillar-shaped ceramic block having the adhesive layer with a thickness of 1.0 mm was manufactured.

Next, a layer formed by a coat layer paste having a thickness of 0.2 mm was formed on the peripheral portion of the ceramic block by using the adhesive paste as a coat layer paste. Further, this paste layer was dried at 120° C. so that a round pillar-shaped honeycomb structure having a size of 143.8 mm in diameter×150 mm in length, with a coat layer formed on the periphery thereof, was manufactured.

(Forming of Catalyst Supporting Layer)

γ-alumina particles were mixed with a sufficient amount of water, and stirred to form an alumina slurry. A honeycomb structure was immersed in this alumina slurry up to an area covering 50% of its overall length, with its one end face facing down, and maintained in this state for one minute.

Next, this honeycomb structure was heated at 110° C. for one hour to be dried, and further fired at 700° C. for one hour so that a catalyst supporting layer was formed in the area covering 50% of its overall length from the end face on the gas inlet side of the honeycomb structure.

Therefore, the rate of the adhesive layer not including the catalyst supporting layer to the overall length of the honeycomb structure was 50%.

At this time, the immersing process into the alumina slurry, drying process, and firing process were repeatedly carried out so that the formation amount of the catalyst supporting layer became 40 g per 1 liter volume of the area with the catalyst supporting layer being formed therein in the honeycomb structure.

(Supporting of Platinum Catalyst)

The honeycomb structure was immersed in diammine dinitro platinum nitric acid ([Pt(NH3)2(NO2)2]HNO3, platinum concentration of 4.53% by weight) up to an area covering 50% of its overall length, with its end face on the gas inlet side of the honeycomb structure facing down and maintained in this state for one minute.

Next, the honeycomb structure was dried at 110° C. for two hours, and further fired at 500° C. for one hour under a nitrogen atmosphere so that a platinum catalyst was supported on the catalyst supporting layer.

The amount of the supported catalyst was 3 g of platinum with respect to 20 g of alumina of the catalyst supporting layer.

By carrying out the aforementioned process, a honeycomb structure in which a catalyst supporting layer including alumina was formed in the area covering 50% of the overall length of the honeycomb structure from the end face on the gas inlet side, and a platinum catalyst was supported on the catalyst supporting layer.

Comparative Example 1

A honeycomb structure was manufactured in the same manner as in Example 1, except that the formation of the catalyst supporting layer and the support of the platinum catalyst were not conducted.

Therefore, in the honeycomb structure manufactured in the present Comparative Example, substantially no catalyst supporting layer was included in the adhesive layer.

Namely, the rate of the adhesive layer including the catalyst supporting layer to the overall length of the honeycomb structure was 0%.

Comparative Example 2

A honeycomb structure was manufactured in the same manner as in Example 1, except that, upon forming the catalyst supporting layer, the entire honeycomb structure was immersed in an alumina slurry and that the entire honeycomb structure was immersed in a solution of dinitro diammine platinum nitrate upon supporting the platinum catalyst.

Here, upon forming the catalyst supporting layer, the immersing process into the alumina slurry, the drying process, and the firing process were carried out repeatedly so that the formation amount of the catalyst supporting layer became 20 g per volume of 1 liter of the area with the catalyst supporting layer being formed therein in the honeycomb structure.

Therefore, the honeycomb structure manufactured in the present Comparative Example was allowed to include a catalyst supporting layer in the entire adhesive layer.

Namely, the rate of the adhesive layer not including the catalyst supporting layer to the overall length of the honeycomb structure was 0%.

(Evaluation of Honeycomb Structure)

By using the following method, an evaluation on the degree of wind erosion and the presence or absence of a crack in the adhesive layer after the regenerating process was carried out.

Figure 3:
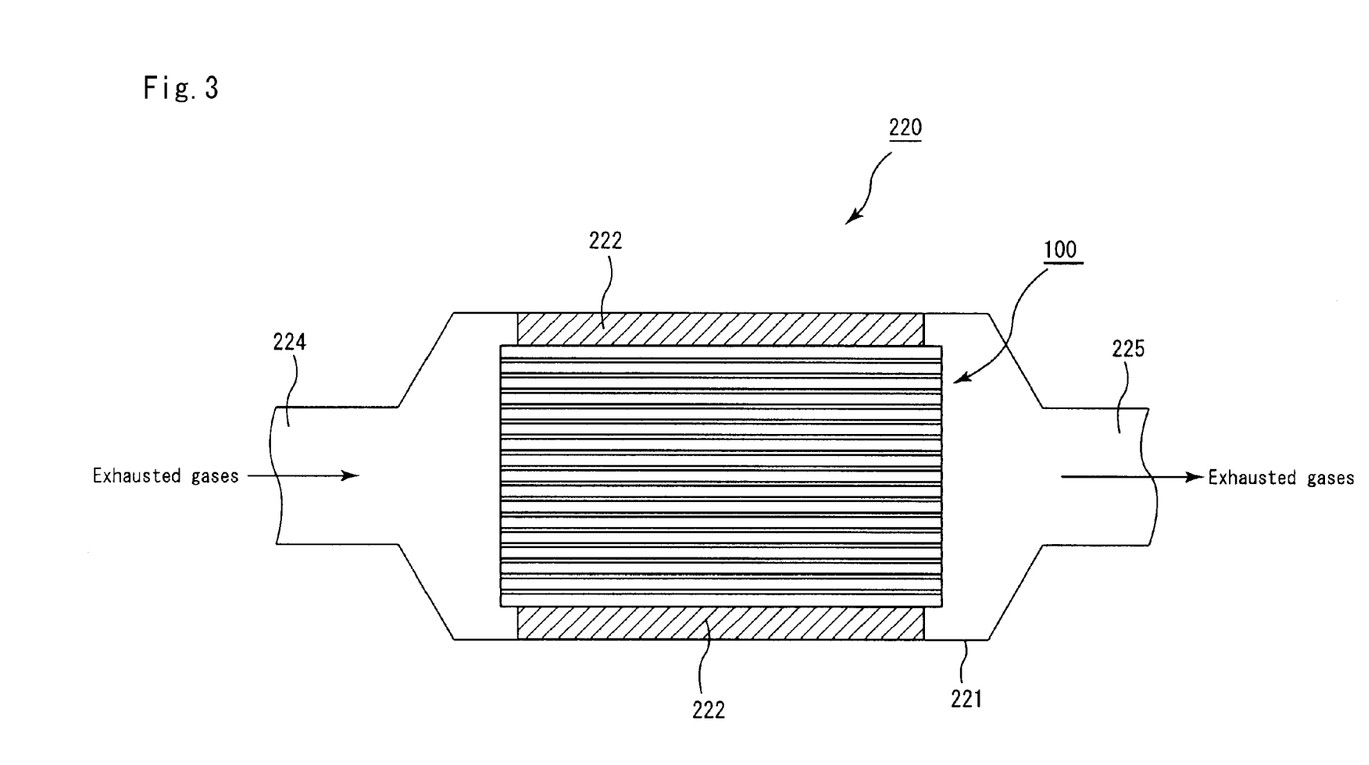
FIG. 3 is a cross-sectional view showing an exhaust gas purifying apparatus to be used upon evaluating the honeycomb structure in an example.

That is, measurements were carried out by using an exhaust gas purifying apparatus, as shown in FIG. 3, in which a honeycomb structure was disposed in an exhaust passage of an engine.

FIG. 3 is a cross-sectional view showing the exhaust gas purifying apparatus to be used upon evaluating the honeycomb structure in Example and Comparative Examples.

An exhaust gas purifying apparatus 220 was mainly configured by a honeycomb structure 100, a casing 221 that covers the outside of the honeycomb structure 100, and a holding sealing material 222 disposed between the honeycomb structure 100 and the casing 221. An introducing pipe 224 coupled to an internal combustion engine, such as an engine, is connected to the end portion of the casing 221 on the side into which exhaust gases are introduced, and an exhaust pipe 225 coupled to the outside is connected to the other end portion of the casing 221. Here, arrows in FIG. 3 indicate flows of exhaust gases. Here, the side of an adhesive layer of the honeycomb structure, which includes a catalyst supporting layer, is defined as the gas inlet side.

The engine was driven at the number of revolutions of 2000 min−1 and a torque of 40 Nm for a predetermined period of time so that 6 g/l of PM was captured. Thereafter, a regenerating process was carried out on the honeycomb structure by continuously carrying out a post-injection for 10 minutes.

After completing the regenerating process, the presence or absence of a crack in the honeycomb structure was visually observed. In a case where no cracks were observed, this state was evaluated as "+", and in a case where any cracks were observed, this state was evaluated as "−". Table 1 shows the results thereof.

Moreover, each of the honeycomb structures (filters) manufactured in Example 1 and Comparative Examples 1 and 2 was placed in the exhaust gas purifying apparatus 220, and the engine was driven at the number of revolutions of 3000 min−1 with a torque of 50 Nm for 240 hours. Thereafter, each of the honeycomb structures was taken out of the exhaust gas purifying apparatus 220, and the honeycomb structure was cross-cut through the adhesive layer so that the state of the adhesive layer on the cutting plane was observed. More specifically, the depth of a recess (distance from the end face of the honeycomb structure to the deepest portion of a recess) in a wind eroded portion of the adhesive layer was measured. The depth of a recess was measured at five points, and the average value was calculated. Table 1 shows the results thereof.

TABLE 1

| | Adhesive layer including catalyst supporting layer | | | | |
|---|---|---|---|---|---|
| | Length from end face on gas outlet side (mm) | Rate to overall length (%) | Formation amount of catalyst supporting layer (g/L) | Degree of wind erosion (mm) | Presence of a crack |
| Example 1 | 75 | 50 | 40 | 0.5 | + |
| Comparative Example 1 | 0 | 0 | NA | 5.2 | + |
| Comparative Example 2 | 150 | 100 | 20 | 2.3 | − |

NA: Data not available

As clearly indicated by the results shown in Table 1, in a case where a catalyst supporting layer is included in an adhesive layer on one end face side (gas inlet side) of a honeycomb structure and substantially no catalyst supporting layer is included in an adhesive layer which abuts the other end face side (gas outlet side) of the honeycomb structure (Example 1), the degree of wind erosion (depth of a recess) in the adhesive layer was small, and occurrence of a crack was not observed.

In contrast, in a case where substantially no catalyst supporting layer was included in the adhesive layer like the honeycomb structure of Comparative Example 1, although no cracks were observed, the depth of a recess exceeded 5 mm; namely, the degree of wind erosion was great.

Moreover, in a case where a catalyst supporting layer was formed in the entire adhesive layer like the honeycomb structure of Comparative Example 2, the degree of wind erosion became greater than that of the honeycomb structure of Example 1, and further, a crack was observed in a plurality of points.

Here, the reason that the degree of wind erosion became greater in Comparative Example 2 than that in Example 1 is presumably because the formation amount of the catalyst supporting layer was smaller in Comparative Example 2 than that in Example 1.

These results have clarified that, in the adhesive layer of a honeycomb structure, by forming an adhesive layer including a catalyst supporting layer on the end face side on the gas inlet side and an adhesive layer not including an catalyst supporting layer on the end face side on the gas outlet side, it is possible to prevent wind erosion in the adhesive layer and occurrence of a crack.

Second Embodiment

The following description will discuss a second embodiment that is one of the embodiments of the present invention.

In the honeycomb structure of the present embodiment, the area not including the catalyst supporting layer in the adhesive layer corresponds to an area covering at least about 10% of the overall length in the longitudinal direction of the honeycomb structure.

That is, in the honeycomb structure of the present embodiment, unlike the honeycomb structure of the first embodiment, the area not including the catalyst supporting layer in the adhesive layer is not required to correspond to an area covering about 50% of the overall length in the longitudinal direction of the honeycomb fired body.

Figure 4A:
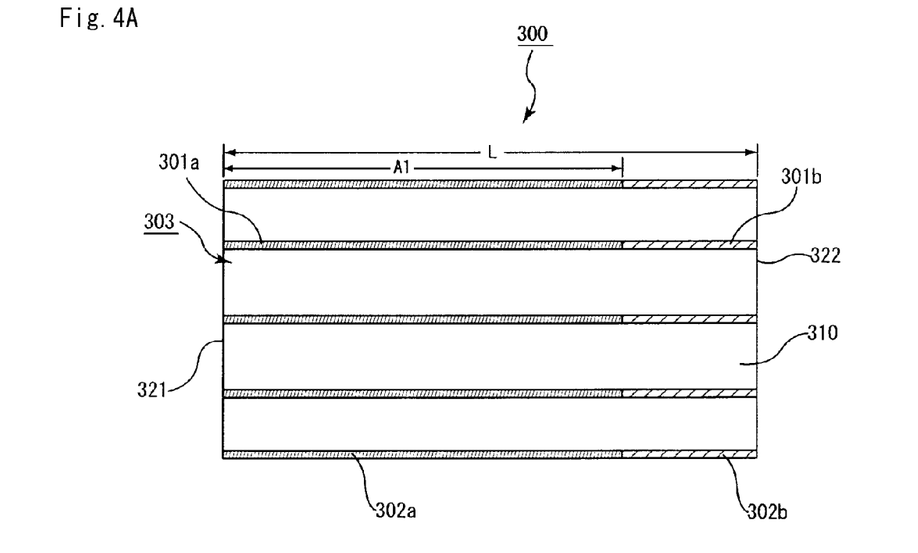
FIGS. 4A and 4B are cross-sectional views schematically showing other examples of honeycomb structure according to the embodiment of the present invention.
Figure 4B:
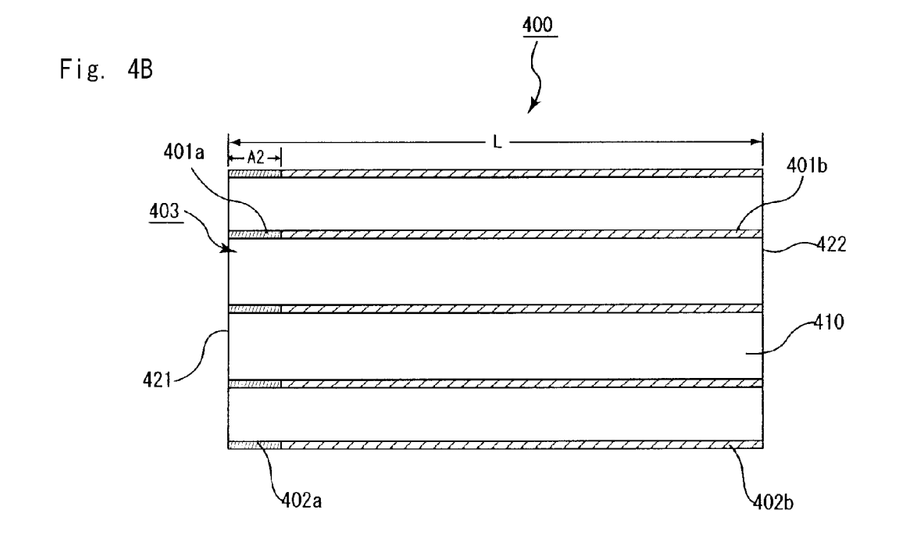

FIGS. 4A and 4B are cross-sectional views schematically showing other examples of the honeycomb structure according to the embodiment of the present invention.

In a honeycomb structure 300 shown in FIG. 4A, out of adhesive layers used for combining honeycomb fired bodies 310, an adhesive layer on the gas inlet side 321 corresponds to an adhesive layer 301a including a catalyst supporting layer made of alumina, and an adhesive layer on the gas outlet side 322 corresponds to an adhesive layer 301b not including a catalyst supporting layer.

Here, the adhesive layer 301a including the catalyst supporting layer is formed in an area (indicated by A1 in FIG. 4A) covering about 75% of the overall length (indicated by L in FIG. 4A) in the longitudinal direction of the honeycomb structure 300 from the gas inlet side 321. The rest of the area of the adhesive layer corresponds to an adhesive layer 301b not including the catalyst supporting layer.

Moreover, in FIG. 4A, reference numeral 302a represents a coat layer including a catalyst supporting layer, reference numeral 302b represents a coat layer not including a catalyst supporting layer, reference numeral 303 represents a ceramic block, and reference numeral 322 represents the gas outlet side.

In a honeycomb structure 400 shown in FIG. 4B, out of the adhesive layers used for combining honeycomb fired bodies 410, an adhesive layer on the gas inlet side 421 corresponds to an adhesive layer 401a including a catalyst supporting layer made of alumina, and an adhesive layer on the gas outlet side 422 corresponds to an adhesive layer 401b not including a catalyst supporting layer.

Here, the adhesive layer 401a including the catalyst supporting layer is formed in an area (indicated by A2 in FIG. 4B) covering about 10% of the overall length (indicated by L in FIG. 4B) in the longitudinal direction of the honeycomb structure 400 from the gas inlet side 421, and the rest of the area of the adhesive layer corresponds to the adhesive layer 401b not including the catalyst supporting layer.

Moreover, in FIG. 4B, reference numeral 402a represents a coat layer including a catalyst supporting layer, reference numeral 402b represents a coat layer not including a catalyst supporting layer, reference numeral 403 represents a ceramic block, and reference numeral 422 represents the gas outlet side.

Of course, in the present embodiment, it is only required for the area not including the catalyst supporting layer in the adhesive layer to correspond to an area covering at least about 10% of the overall length in the longitudinal direction of the honeycomb structure. The area is not intended to be limited to an area covering about 10% or about 75% of the overall length in the longitudinal direction of the honeycomb structure, as shown in FIGS. 4A and 4B.

Moreover, the area including the catalyst supporting layer in the adhesive layer desirably corresponds to an area covering about 25% or more of the overall length in the longitudinal direction of the honeycomb structure from the side into which exhaust gases are allowed to flow.

The reason for this is that, when the area including the catalyst supporting layer in the adhesive layer is within this range, it becomes easy to more positively prevent wind erosion in the adhesive layer.

In the honeycomb structure of the present embodiment as well, the same effects (1) and (2) as those of the honeycomb structure of the first embodiment can be obtained.

Examples 2 to 5

A honeycomb structure was manufactured in the same manner as in Example 1, except that the area of the honeycomb structure to be immersed in an alumina slurry upon forming the catalyst supporting layer and the area of the honeycomb structure to be immersed in a solution of dinitro diammine platinum nitrate upon supporting the platinum catalyst were changed to change the area including the catalyst supporting layer in the adhesive layer as shown in Table 2.

Namely, the rate of the adhesive layer including the catalyst supporting layer to the overall length of the honeycomb structure (the rate of the adhesive layer not including the catalyst supporting layer to the overall length of the honeycomb structure) was 25% (75%) in Example 2, 33% (67%) in Example 3, 67% (33%) in Example 4 and 87% (13%) in Example 5.

Here, the formation amount of the catalyst supporting layer was also changed as shown in Table 2.

With respect to each of the honeycomb structures manufactured in Examples 2 to 5, an evaluation on the degree of wind erosion and the presence or absence of a crack in the adhesive layer after completing the regenerating process was carried out. Table 2 shows the results thereof. Here, the results of Example 1 are also shown in Table 2 for reference.

Figure 5:
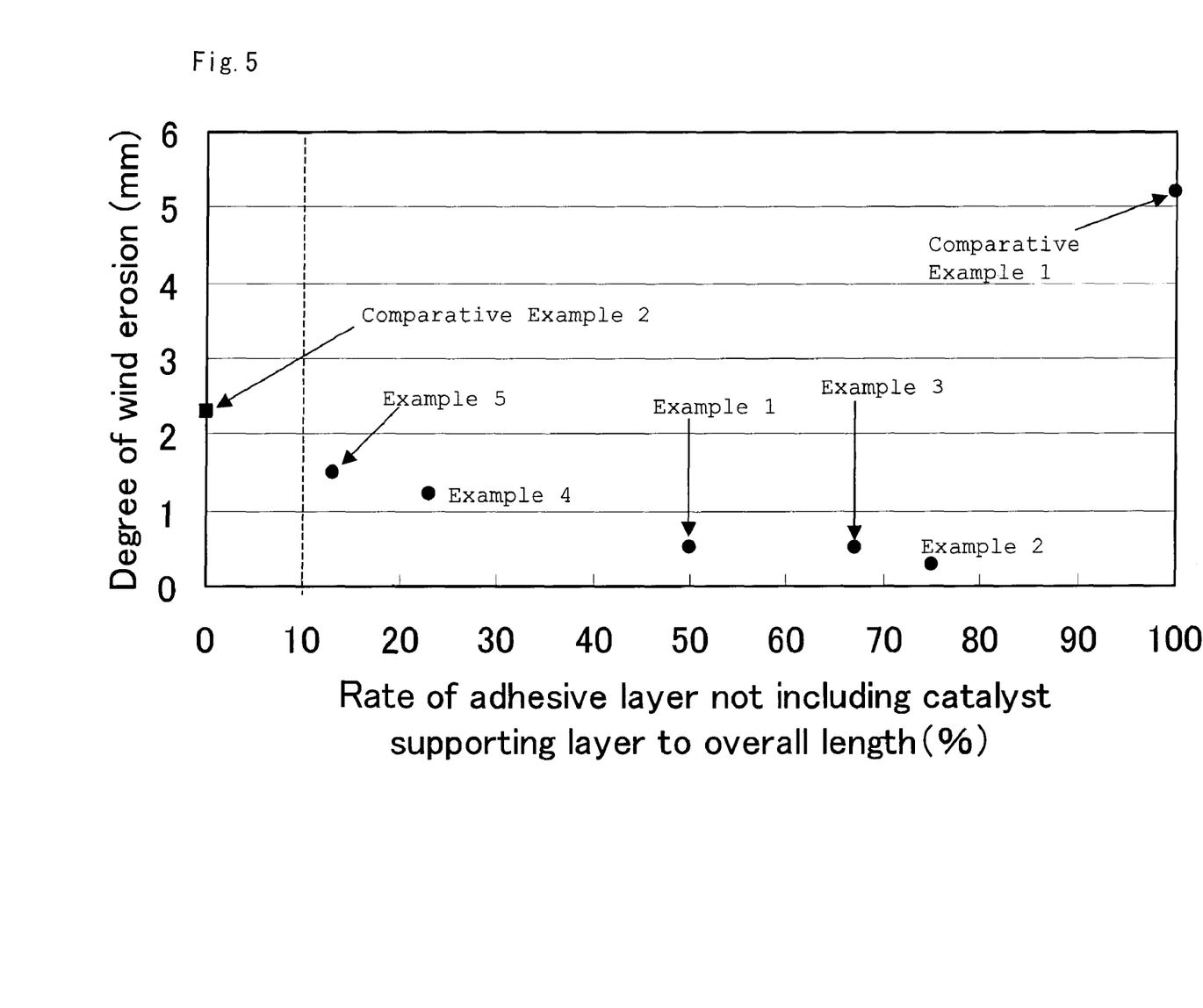
FIG. 5 is a graph showing a relation between the rate of the adhesive layer not including the catalyst supporting layer to the overall length of the honeycomb structure according to the embodiment of the present invention and the degree of the wind erosion, and the presence or absence of a crack.

Here, as already described, the results shown in FIG. 5 clarifies that, by forming an adhesive layer including a catalyst supporting layer on the end face side on the gas inlet side and an adhesive layer not including an catalyst supporting layer on the end face side on the gas outlet side, it becomes easy to prevent wind erosion in the adhesive layer and occurrence of a crack. Further, the results shown in FIG. 5 also clarifies that, in a case where the area not including the catalyst supporting layer in the adhesive layer corresponds to an area covering about 10% or more of the overall length in the longitudinal direction of the honeycomb structure, the degree of wind erosion (depth of a depression) in the adhesive layer is small.

Third Embodiment

The following description will discuss a third embodiment that is one of the embodiments of the present invention.

In the present embodiment, the adhesive layer included in the honeycomb structure is formed by using a composition including as a component: inorganic fibers and an inorganic binder; inorganic particles and an inorganic binder; or inorganic fibers, inorganic particles and an inorganic binder.

Examples of the inorganic fibers include ceramic fibers such as silica-alumina, mullite, alumina, and silica. Each of these may be used alone or two or more kinds of these may be used in combination. Out of the inorganic fibers, alumina fibers are more desirably used.

Examples of the inorganic particles include particles including a carbide ceramic or a nitride ceramic.

Specific examples thereof include inorganic powder including silicon carbide, silicon nitride, boron nitride or the like. Each of these may be used alone, or two or more kinds of

TABLE 2

| | Adhesive layer including catalyst supporting layer | | | | |
| --- | --- | --- | --- | --- | --- |
| | Length from end face on gas outlet side (mm) | Rate to overall length (%) | Formation amount of catalyst supporting layer (g/L) | Degree of wind erosion (mm) | Presence of a crack |
| Example 1 | 75 | 50 | 40 | 0.5 | + |
| Example 2 | 37.5 | 25 | 80 | 0.3 | + |
| Example 3 | 50 | 33 | 60 | 0.5 | + |
| Example 4 | 100 | 67 | 30 | 1.2 | + |
| Example 5 | 130 | 87 | 23 | 1.5 | + |

As clearly indicated by the results shown in Table 2, in a case where the area not including the catalyst supporting layer in the adhesive layer corresponds to an area covering about 10% or more of the overall length in the longitudinal direction of the honeycomb structure, the degree of wind erosion (depth of a depression) in the adhesive layer was small, and occurrence of a crack was not observed.

Here, with respect to the honeycomb structures manufactured in Examples and Comparative Examples, a relation between the rate of the adhesive layer not including the catalyst supporting layer to the overall length of the honeycomb structure and the degree of the wind erosion, and the presence or absence of a crack are shown in FIG. 5. FIG. 5 is a graph showing the relation between the rate of the adhesive layer not including the catalyst supporting layer to the overall length of the honeycomb structure, and the degree of the wind erosion. Here, in this graph, the honeycomb structure (Examples 1 to 5, Comparative Example 1) not having a crack caused therein is plotted by a filled dot ("●") and the honeycomb structure (Comparative Example 2) having a crack caused therein is plotted by a filled square ("■").

these may be used in combination. Out of the inorganic particles, silicon carbide is desirably used due to its superior thermal conductivity.

Examples of the inorganic binder include silica sol, alumina sol, and the like. Each of these may be used alone or two or more kinds of these may be used in combination. Out of the inorganic binders, silica sol is more desirably used.

Moreover, the composition for forming the adhesive layer may include an organic binder, if necessary.

Examples of the organic binder include polyvinyl alcohol, methyl cellulose, ethyl cellulose, carboxymethyl cellulose, and the like. Each of these may be used alone or two or more kinds of these may be used in combination. Out of the organic binders, carboxymethyl cellulose is more desirably used.

Furthermore, if necessary, the composition for forming the adhesive layer may include a pore-forming agent, such as balloons that are fine hollow spheres including an oxide-based ceramic, spherical acrylic particles, and graphite.

Examples of the balloons include alumina balloons, glass micro-balloons, shirasu balloons, fly ash balloons (FA balloons), mullite balloons, and the like. Out of these, alumina balloons are more desirably used.

In the honeycomb structure of the present embodiment, since the adhesive layer is formed by using the above-mentioned composition, the adhesive layer is allowed to have higher elasticity in comparison with the honeycomb fired body and suitably alleviates a stress generated in the honeycomb structure.

In the honeycomb structure of the present embodiment as well, the same effects (1) and (2) as those of the honeycomb structure of the first embodiment can be obtained.

Fourth Embodiment

The following description will discuss a fourth embodiment that is one of the embodiments of the present invention.

In the present embodiment, the catalyst supporting layer included in the adhesive layer includes an oxide ceramic.

Specific examples of the oxide ceramic include alumina, titania, zirconia, silica, and the like. Each of these may be used alone or two or more kinds of these may be used in combination.

Out of these, γ-alumina having a high specific surface area of about 50 m2/g or more is, in particular, desirably used.

As the method for forming the catalyst supporting layer made of alumina, not particularly limited to the method described in the first embodiment, another method may be used in which a honeycomb structure is immersed in a solution of metal compound containing aluminum, such as an aqueous solution of aluminum nitrate, so that cell walls are coated with an alumina film through a sol-gel method, and the resulting honeycomb structure is dried and fired.

In the honeycomb structure of the present embodiment, since the catalyst supporting layer is made of an oxide ceramic, a specific surface area is high so that a catalyst supporting layer capable of highly dispersing a catalyst is desirably formed.

In the honeycomb structure of the present embodiment as well, the same effects (1) and (2) as those of the honeycomb structure of the first embodiment can be obtained.

Other Embodiments

In the honeycomb structure according to the embodiment of the present invention, in a case where the catalyst supporting layer is formed not only in the adhesive layer, but also on cell walls forming the honeycomb fired body, the area including the catalyst supporting layer in the adhesive layer and the area of the cell walls with the catalyst supporting layer being formed thereon are not necessarily required to have virtually the same rate to the overall length of the honeycomb structure, but may have different rates.

With respect to the shape of the honeycomb structure according to the embodiment of the present invention, it is not particularly limited to the round pillar shape shown in FIG. 1A, and the honeycomb structure may have any desired pillar shape, such as a cylindroid shape and a rectangular pillar shape.

The porosity of the honeycomb fired body forming the honeycomb structure according to the embodiment of the present invention is desirably at least about 30% and at most about 70%. This structure makes it possible to maintain sufficient strength in the honeycomb structure and concurrently, it becomes easy to maintain a low level resistance at the time of passage of exhaust gases through the cell walls.

In contrast, the porosity of less than about 30% tends to easily cause clogging in the cell walls in an early stage, while the porosity of more than about 70% tends to easily cause a decrease in strength of the honeycomb structure with the result that the honeycomb structure tends to be easily broken.

Here, the porosity can be measured through conventionally known methods, such as a mercury injection method, Archimedes method, and a measuring method using a scanning electronic microscope (SEM).

The cell density on a cross section perpendicular to the longitudinal direction of the honeycomb structure is not particularly limited. However, a desirable lower limit is about 31.0 pcs/cm2 (about 200 pcs/in2) and a desirable upper limit is about 93 pcs/cm2 (about 600 pcs/in2). A more desirable lower limit is about 38.8 pcs/cm2 (about 250 pcs/in2) and a more desirable upper limit is about 77.5 pcs/cm2 (about 500 pcs/in2).

The main component of constituent materials of the honeycomb structure is not limited to silicon carbide, and may include: a nitride ceramic such as aluminum nitride, silicon nitride, boron nitride, and titanium nitride; a carbide ceramic such as zirconium carbide, titanium carbide, tantalum carbide, and tungsten carbide; a complex of a metal and a nitride ceramic; a complex of a metal and a carbide ceramic; and the like.

Moreover, the main component of constituent materials also includes a silicon-containing ceramic prepared by compounding a metal silicon into the above-mentioned ceramics and a ceramic material such as a ceramic bonded by a silicon or a silicate compound. Furthermore, cordierite, aluminum titanate or the like may also be used as the main component of constituent materials.

Out of these, silicon carbide is particularly desirably used as the main component of the constituent materials of the honeycomb structured body, because silicon carbide is excellent in heat resistant property, mechanical strength, thermal conductivity and the like. Moreover, a material prepared by compounding metal silicon with silicon carbide (silicon carbide containing metal silicon) is also desirable.

Although the particle diameter of silicon carbide powder used upon preparation of the wet mixture is not particularly limited, it is desirable to use the silicon carbide powder that tends not to cause the case where the size of the honeycomb fired body manufactured by the following firing treatment becomes smaller than that of the honeycomb molded body. For example, it is desirable to use 100 parts by weight of the powder having an average particle diameter of at least about 1.0 μm and at most about 50.0 μm and at least about 5 parts by weight and at most about 65 parts by weight of the powder having an average particle diameter of at least about 0.1 μm and at most about 1.0 μm.

By adjusting the particle diameter of the silicon carbide powder in the aforementioned range, the pore diameter of the honeycomb fired body can be properly adjusted. On the other hand, the pore diameter of the honeycomb fired body can be also adjusted by regulating the firing temperature.

The organic binder in the wet mixture is not particularly limited, and examples thereof include carboxymethyl cellulose, hydroxyethyl cellulose, polyethylene glycol, and the like. Out of these, methylcellulose is more desirably used. In general, the compounding amount of the organic binder is desirably at least about 1 part by weight and at most about 10 parts by weight with respect to 100 parts by weight of the silicon carbide powder and the like.

A plasticizer and a lubricant to be used upon preparing the wet mixture are not particularly limited, and for example, glycerin or the like may be used as the plasticizer. Moreover, as the lubricant, for example, polyoxy alkylene-based compounds, such as polyoxyethylene alkyl ether and polyoxypropylene alkyl ether, and the like may be used.

Specific examples of the lubricant include polyoxyethylene monobutyl ether, polyoxypropylene monobutyl ether, and the like.

Here, the plasticizer and the lubricant are not necessarily contained in the wet mixture depending on cases.

Upon preparing the wet mixture, a dispersant solution may be used, and examples of the dispersant solution include water, an organic solvent such as benzene, and alcohol such as methanol, and the like.

Moreover, a molding auxiliary may be added to the wet mixture.

The molding auxiliary is not particularly limited, and examples thereof include ethylene glycol, dextrin, fatty acid, fatty acid soap, polyalcohol, and the like.

Furthermore, a pore-forming agent, such as balloons that are fine hollow spheres comprising an oxide-based ceramic, spherical acrylic particles, and graphite may be added to the wet mixture, if necessary.

With respect to the balloons, not particularly limited, for example, alumina balloons, glass micro-balloons, shirasu balloons, fly ash balloons (FA balloons), mullite balloons and the like may be used. Out of these, alumina balloons are more desirably used.

Moreover, the content of organic components in the wet mixture is desirably about 10% by weight or less, and the content of moisture is desirably at least about 8% by weight and at most about 30% by weight.

Although a plug material paste used for sealing cells is not particularly limited, the plug material paste that allows the plugs manufactured through post processes to have a porosity of at least about 30% and at most about 75% is desirably used. For example, the same material as that of the wet mixture may be used.

With respect to the catalyst to be supported on the surface of the catalyst supporting layer, for example, noble metals such as platinum, palladium, and rhodium are desirably used. Out of these, platinum is more preferably used. Moreover, with respect to other catalysts, alkali metals such as potassium, sodium, or alkali-earth metals such as barium may be used. Each of these catalysts may be used alone, or two or more kinds of these may be used in combination.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A honeycomb structure comprising:
   a plurality of pillar-shaped honeycomb fired bodies each having a large number of cells longitudinally disposed in parallel with one another with a cell wall therebetween, the plurality of pillar-shaped honeycomb fired bodies being combined with one another by interposing an adhesive layer,
   wherein a catalyst supporting layer is included in said adhesive layer which abuts one end face side of said honeycomb structure, and
   wherein substantially no catalyst supporting layer is included in said adhesive layer which abuts another end face side of said honeycomb structure.

2. The honeycomb structure according to claim 1,
   wherein gases are allowed to flow into said one end face side with said adhesive layer including said catalyst supporting layer, and allowed to flow out from said other end face side.

3. The honeycomb structure according to claim 2,
   wherein an area including said catalyst supporting layer in said adhesive layer corresponds to an area covering about 25% or more of an overall length in the longitudinal direction of said honeycomb structure from the one end face side into which said gases are allowed to flow.

4. The honeycomb structure according to claim 1,
   wherein either one end of each of said cells in said honeycomb fired body is sealed.

5. The honeycomb structure according to claim 1,
   wherein an area not including said catalyst supporting layer in said adhesive layer corresponds to an area covering at least about 10% of the overall length in the longitudinal direction of said honeycomb structure.

6. The honeycomb structure according to claim 1,
   wherein said adhesive layer comprises a composition including as a main component: inorganic fibers and an inorganic binder; inorganic particles and an inorganic binder; or inorganic fibers, inorganic particles and an inorganic binder.

7. The honeycomb structure according to claim 6,
   wherein said inorganic particles are particles comprising a carbide ceramic or a nitride ceramic.

8. The honeycomb structure according to claim 1,
   wherein said catalyst supporting layer included in said adhesive layer comprises an oxide ceramic.

9. The honeycomb structure according to claim 8,
   wherein said catalyst supporting layer comprises alumina, titania, zirconia, or silica.

10. The honeycomb structure according to claim 1, further comprising:
    a catalyst supporting layer formed on said cell wall included in said honeycomb fired body, and
    wherein an area including said catalyst supporting layer in said adhesive layer and an area of said cell wall with said catalyst supporting layer formed thereon have a same rate to an overall length of said honeycomb structure.

11. The honeycomb structure according to claim 1, further comprising a catalyst supporting layer formed on said cell wall included in said honeycomb fired body, and
    wherein an area including said catalyst supporting layer in said adhesive layer and an area of said cell wall with said catalyst supporting layer formed thereon have different rates to an overall length of said honeycomb structure.

12. The honeycomb structure according to claim 1,
    wherein a main component of a constituent material of said honeycomb fired body comprises silicon carbide or silicon carbide containing metal silicon.

13. The honeycomb structure according to claim 1,
    wherein a catalyst is supported on a surface of said catalyst supporting layer.

14. The honeycomb structure according to claim 13,
    wherein said catalyst comprises a noble metal, an alkali metal, or an alkali-earth metal.

15. The honeycomb structure according to claim 14,
    wherein said catalyst comprises platinum.

16. A method for manufacturing a honeycomb structure, said method comprising:
    providing a plurality of pillar-shaped honeycomb fired bodies each having a large number of cells longitudinally disposed in parallel with one another with a cell wall therebetween, the plurality of pillar-shaped honeycomb fired bodies being combined with one another by interposing an adhesive layer to form a honeycomb structure;
    immersing said honeycomb structure in a metal-compound solution with one end face of said honeycomb structure facing down so that a predetermined area, in which the catalyst supporting layer is to be formed, is immersed in said metal-compound solution; and adhering particles for forming said catalyst supporting layer to the predetermined area of said honeycomb structure selectively to form a catalyst supporting layer, wherein said catalyst supporting layer is formed in said adhesive layer which abuts one end face side of said honeycomb structure, and wherein substantially no catalyst supporting layer is formed in said adhesive layer which abuts another end face side of said honeycomb structure.

17. The method for manufacturing a honeycomb structure according to claim 16, said method further comprising:

immersing said honeycomb structure in a solution of a metal compound with one end face of said honeycomb structure with said catalyst supporting layer formed thereon facing down so that the predetermined area with the catalyst supporting layer formed thereon is immersed in said solution of a metal compound;

drying the immersed honeycomb structure;

firing the dried honeycomb structure, so that a catalyst is supported on said catalyst supporting layer.

18. The method for manufacturing a honeycomb structure according to claim 17, wherein said solution of a metal compound includes a noble metal, an alkali metal, or an alkali-earth metal.

19. The method for manufacturing a honeycomb structure according to claim 18, wherein said solution of a metal compound includes platinum.

20. The method for manufacturing a honeycomb structure according to claim 16, wherein said metal-compound solution comprises alumina, titania, zirconia, or silica.

21. The method for manufacturing a honeycomb structure according to claim 20, wherein said metal-compound solution comprises an aqueous solution of alumina nitrate.

22. The method for manufacturing a honeycomb structure according to claim 16, said method further comprising:

filling a plug material paste into only cells that need to be sealed, out of said large number of cells of said honeycomb structure.

23. The method for manufacturing a honeycomb structure according to claim 16, said method further comprising:

cutting an aggregated body of a plurality of said honeycomb fired bodies combined with one another by interposing said adhesive layer.

24. The method for manufacturing a honeycomb structure according to claim 16, said method further comprising:

forming a coat layer by applying a coat layer paste on a peripheral face of said honeycomb structure and by drying said coat layer paste so as to be solidified.

25. The method for manufacturing a honeycomb structure according to claim 16, wherein an area not including said catalyst supporting layer in said adhesive layer corresponds to an area covering at least about 10% of an overall length in the longitudinal direction of said honeycomb structure.

26. The method for manufacturing a honeycomb structure according to claim 16, wherein said adhesive layer is formed by using a composition including as a main component: inorganic fibers and an inorganic binder; inorganic particles and an inorganic binder; or inorganic fibers, inorganic particles and an inorganic binder.

27. The method for manufacturing a honeycomb structure according to claim 26, wherein said inorganic particles are particles comprising a carbide ceramic or a nitride ceramic.

28. The method for manufacturing a honeycomb structure according to claim 16, wherein said catalyst supporting layer included in said adhesive layer comprises an oxide ceramic.

29. The method for manufacturing a honeycomb structure according to claim 16, said method further comprising:

forming said catalyst supporting layer on said cell wall included in said honeycomb fired body, wherein an area including said catalyst supporting layer in said adhesive layer and an area of said cell wall with said catalyst supporting layer formed thereon have a same rate to an overall length of said honeycomb structure.

30. The method for manufacturing a honeycomb structure according to claim 16, said method further comprising:

forming said catalyst supporting layer on said cell wall included in said honeycomb fired body, wherein an area including said catalyst supporting layer in said adhesive layer and an area of said cell wall with said catalyst supporting layer formed thereon have different rates to an overall length of said honeycomb structure.

31. The method for manufacturing a honeycomb structure according to claim 16, wherein a main component of a constituent material of said honeycomb fired body comprises silicon carbide or silicon carbide containing metal silicon.

32. An exhaust gas purifying apparatus comprising:

a honeycomb structure;

a casing that covers an outside of said honeycomb structure; and a holding sealing material disposed between said honeycomb structure and said casing, wherein said honeycomb structure includes a plurality of pillar-shaped honeycomb fired bodies each having a large number of cells longitudinally disposed in parallel with one another with a cell wall therebetween, the plurality of pillar-shaped honeycomb fired bodies being combined with one another by interposing an adhesive layer, wherein a catalyst supporting layer is included in said adhesive layer which abuts one end face side of said honeycomb structure, and wherein substantially no catalyst supporting layer is included in said adhesive layer which abuts another end face side of said honeycomb structure.

33. The exhaust gas purifying apparatus according to claim 32, wherein gases are allowed to flow into said one end face side with said adhesive layer including said catalyst supporting layer, and allowed to flow out from said other end face side.

34. The exhaust gas purifying apparatus according to claim 33, wherein an area including said catalyst supporting layer in said adhesive layer corresponds to an area covering about 25% or more of an overall length in the longitudinal direction of said honeycomb structure from the one end face side into which said gases are allowed to flow.

35. The exhaust gas purifying apparatus according to claim 32, wherein either one end of each of said cells in said honeycomb fired body is sealed.

36. The exhaust gas purifying apparatus according to claim 32,
wherein an area not including said catalyst supporting layer in said adhesive layer corresponds to an area covering at least about 10% of an overall length in the longitudinal direction of said honeycomb structure.

37. The exhaust gas purifying apparatus according to claim 32,
wherein said adhesive layer comprises a composition including as a main component: inorganic fibers and an inorganic binder; inorganic particles and an inorganic binder; or inorganic fibers, inorganic particles and an inorganic binder.

38. The exhaust gas purifying apparatus according to claim 37,
wherein said inorganic particles are particles comprising a carbide ceramic or a nitride ceramic.

39. The exhaust gas purifying apparatus according to claim 32,
wherein said catalyst supporting layer included in said adhesive layer comprises an oxide ceramic.

40. The exhaust gas purifying apparatus according to claim 39,
wherein said catalyst supporting layer comprises alumina, titania, zirconia, or silica.

41. The exhaust gas purifying apparatus according to claim 32 further comprising:
a catalyst supporting layer formed on said cell wall included in said honeycomb fired body,
wherein an area including said catalyst supporting layer in said adhesive layer and an area of said cell wall with said catalyst supporting layer formed thereon have a same rate to an overall length of said honeycomb structure.

42. The exhaust gas purifying apparatus according to claim 32 further comprising:
a catalyst supporting layer formed on said cell wall included in said honeycomb fired body,
wherein an area including said catalyst supporting layer in said adhesive layer and an area of said cell wall with said catalyst supporting layer formed thereon have different rates to the overall length of said honeycomb structure.

43. The exhaust gas purifying apparatus according to claim 32,
wherein a main component of a constituent material of said honeycomb fired body comprises silicon carbide or silicon carbide containing metal silicon.

44. The exhaust gas purifying apparatus according to claim 32,
wherein a catalyst is supported on a surface of said catalyst supporting layer.

45. The exhaust gas purifying apparatus according to claim 44,
wherein said catalyst comprises a noble metal, an alkali metal, or an alkali-earth metal.

46. The exhaust gas purifying apparatus according to claim 45,
wherein said catalyst comprises platinum.

* * * * *